June 23, 1925.
J. F. O'CONNOR
1,542,828
FRICTION SHOCK ABSORBING MECHANISM
Original Filed June 30, 1921   2 Sheets-Sheet 1
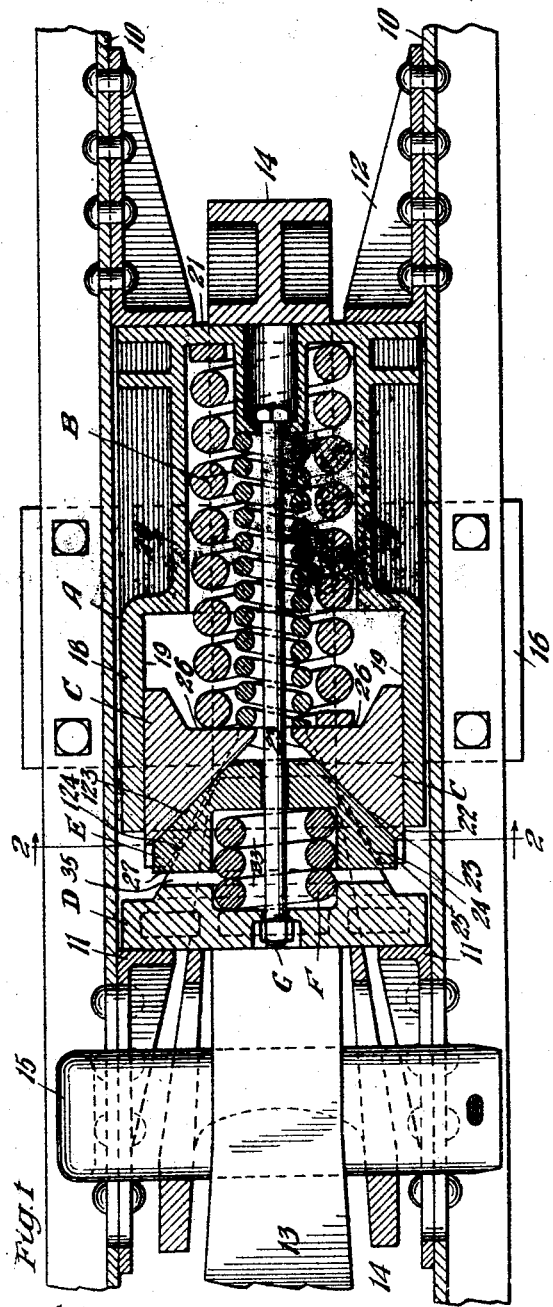
Witnesses
Wm. Geiger
Inventor
John F. O'Connor
By Geo. I. Haight
His Atty.

June 23, 1925.
J. F. O'CONNOR
1,542,828
FRICTION SHOCK ABSORBING MECHANISM
Original Filed June 30, 1921  2 Sheets-Sheet 2
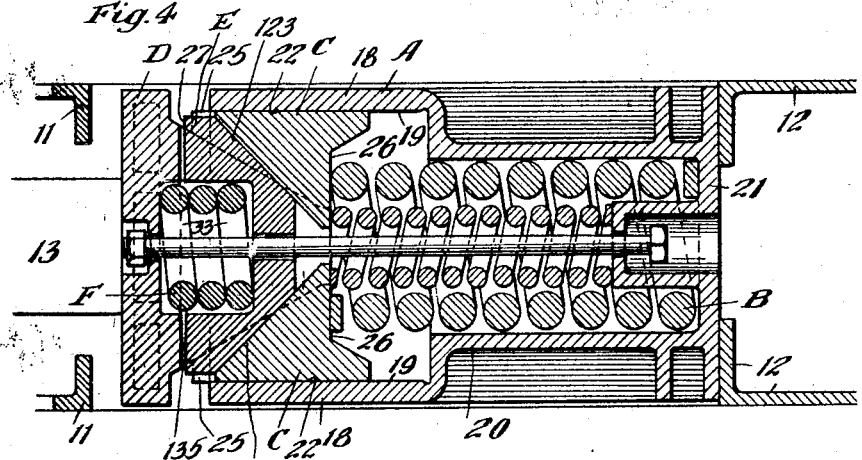
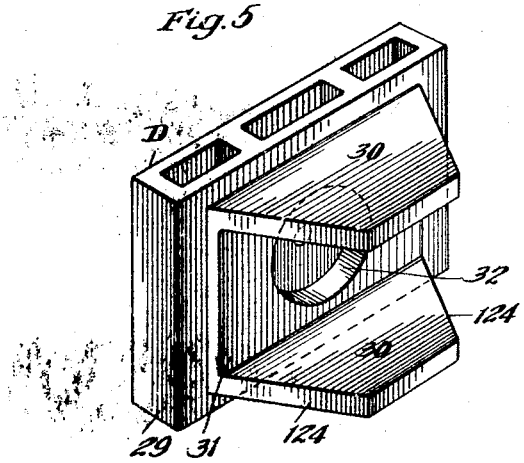
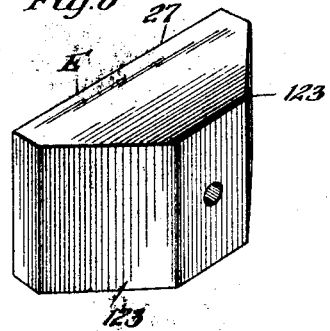
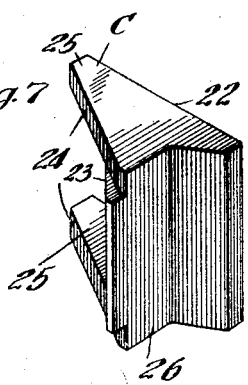
Witnesses
Wm. Geiger
Inventor
John F. O'Connor
By Geo. I. Haight
His Atty.

Patented June 23, 1925.

1,542,828

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed June 30, 1921, Serial No. 481,555. Renewed October 24, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings and wherein is obtained certain release.

A more specific object of the invention is to provide a mechanism of the character indicated having a preliminary spring of unusually high capacity so arranged that said spring is actuated under minor shocks transmitted to the mechanism without any appreciable actuation of the friction elements or main spring resistance, thereby prolonging the life of the mechanism.

Other specific objects of the invention are to provide a mechanism of the character indicated wherein are employed relatively blunt and relatively keen wedge faces, the parts being so arranged that the action changes automatically from a blunt wedge condition to a keen wedge condition during a compression stroke and also to provide a wedge arrangement possessing both blunt and keen wedge-acting faces, of a self-releasing character.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith, the condition of the shock absorbing mechanism being that which obtains under full release or normal position. Fig. 2 is a vertical transverse sectional view corresponding substantially to the line 2—2 of Fig. 1. Fig. 3 is a vertical longitudinal central sectional view of the shock absorbing mechanism proper, shown in Fig. 1. Fig. 4 is a view similar to Fig. 1 but illustrating the position assumed by the parts just as the keen angled wedges come into engagement with the corresponding wedge faces of the friction shoes. And Figures 5, 6 and 7 are detail perspectives of the follower wedge member, blunt wedge member and one of the friction shoes, respectively.

In said drawings 10—10 denote channel draft sills of a railway car to the inner faces of which are secured front stop lugs 11 and rear stop lugs 12. A portion of a draw bar is indicated at 13, the same being operatively associated with the shock absorbing mechanism proper by a hooded cast yoke 14 and coupler key 15. The yoke and shock absorbing mechanism are adapted to be supported in operative position by a detachable saddle plate 16.

The improved shock absorbing mechanism proper, as shown, comprises, broadly, a combined friction shell and spring cage casting A; a main spring resistance B; a pair of friction shoes C—C; a combined follower and wedge D; a separate wedge element E; a preliminary spring F; and a retainer bolt G.

The casting A, at its outer or forward end, is provided with top and bottom horizontally extending walls 17—17 and vertical side walls 18—18 thereby defining what may be termed a rectangular friction shell or barrel having longitudinally extending interior flat friction surfaces 19—19 on the inner sides of the side walls 18—18. Rearwardly of the shell proper just described, the side walls of the casting A are offset inwardly as indicated at 20—20 to define the spring cage proper for centering the main spring B. At its rear end the casting A is formed with an integral transverse vertical wall 21 adapted to act as the rear follower of the mechanism. Suitable strengthening ribs are employed to brace the walls of the casting A.

The friction shoes C are two in number and of like construction. Each is formed on its outer side with a longitudinally extending flat friction surface 22 slidable upon the corresponding shell friction surface 19. On its inner side, each shoe C is formed with a relatively wide wedge face 23 extending at a relatively blunt angle with respect to the axis of the mechanism. Above and below the wedge face 23 each shoe C is formed with other wedge faces 24—24 which extend at a relatively keen angle with respect to the axis of the mechanism, said wedge faces 24 being on wings 25—25 integral with the main part of the shoe. On account of the wedge formation of each shoe C there is provided a transverse shoulder 26 near the inner end thereof and against which the forward end of the main spring B is adapted to bear. The opposite end of the spring B presses against the rear portion of the casting A.

The blunt wedge element E is formed on the sides thereof with wedge faces 123—123 cooperable with the wedge faces 23 of the shoes and extending at the same angle as the latter. At its outer end, the wedge element E is formed with a transversely extending surface 27 and a cup-shaped or cylindrical recess 28 in axial alinement with the the center line of the mechanism and in which the preliminary spring is adapted to be seated.

The combined wedge follower D is formed to provide a main front follower section 29 directly cooperable with the stop lugs 11. On its inner side it is provided with upper and lower inwardly extending horizontally disposed flanges 30—30, each of which is tapered inwardly so as to provide wedge faces 124—124 on the edges thereof, said wedge faces 124 extending at the same angle as the wedge faces 24 of the shoes. Preferably the wedge follower D is built up on its inner side as indicated at 31, between the wings 30—30 and a relatively shallow pocket or recess 32 is provided in which is seated the forward end of the preliminary spring F.

The retainer bolt G is anchored at its rear end in a hollow boss formed integrally with the casting A and at its forward end in a suitable socket formed in wedge follower D. Said bolt extends axially of the main spring B between the shoes C, through a suitable aperture in the wedge element E and through the preliminary spring F.

The preliminary spring F is of unusual construction in order to obtain exceptionally high capacity with a short stroke within a small space. To this end, the preliminary spring F preferably comprises three like coils 33—33, each coil extending through an arc of substantially 360° and having the ends of each coil squared off as indicated at 34 in Fig. 3. Each coil or single turn is made of relatively heavy wire or bar material, with a pitch somewhat less than the diameter of the bar so that the squared ends of one coil will face and abut the squared ends of adjacent coils. By employing three independent coils which are in parallel abutting relation as shown, I am enabled to obtain a spring capacity for the unit which is three times that of the capacity of each single coil 33. For a more complete description of the advantages and manner of operation of such a spring, reference may be had to my co-pending application 441,127 filed January 31, 1921 for high capacity springs. At this point, it may be added that the compression stroke of my preliminary spring F is comparatively short, slightly more than a half inch in actual practice, but this does not militate against the functions of the preliminary spring since only a short compression stroke is desirable for a preliminary action. On the contrary, high capacity of a true spring nature is desirable for the preliminary spring and I believe I am the first in the art to provide a preliminary spring having the high capacity referred to and where such spring is of such compact form.

In normal condition of the parts, as shown in Fig. 1, there is a space indicated at 35 between the opposing portions of the wedge follower D and the wedge element E and also there is normally a space between the keen wedge faces 24 and 124 in order to provide for the operation now to be described.

The operation is as follows, assuming an inward or buffing movement of the draw bar. As the latter moves inwardly the wedge follower D is inwardly, simultaneously and uniformly moved therewith. Initially, sufficient resistance will be afforded the wedge element E on account of the main spring reacting through the shoes C to prevent any appreciable movement of the blunt wedge element E. Consequently, any minor shocks or short movements of the wedge follower D, which constitute the greater portion of the shocks occurring in actual service, will be absorbed by the preliminary spring F without involving any appreciable wear on any of the friction elements. This is of extreme importance inasmuch as it prolongs the life of the mechanism and also affords a relatively high spring resistance for even the preliminary or small shocks. Heretofore, where a spring having a compression stroke equal to the full movement of the draw bar has been employed to absorb the preliminary movements, the capacity or resistance afforded by the spring during the first half inch or so of its compression has been an extremely small percentage of the full capacity of the spring as will be understood by those skilled in the art by considering the ordinary compression diagram of a spring.

If the shock on the draw bar in the buffing movement is sufficiently great so that it is not entirely absorbed by the preliminary spring F without actuation of the friction shoes, the continued inward movement of the wedge follower D will gradually start up the blunt wedge element E and compel the latter and the shoe C to travel inwardly. As the wedge element E and shoes C travel inwardly of the shell, the resistance obviously gradually increases until the preliminary spring F will be still further compressed and the wedge follower D allowed to advance relatively to the wedge element E. Its action continues until the wedge faces 124 of the wedge follower D comes into contact with the wedge faces 24 of the shoes which is the condition illustrated in Fig. 4. The parts will be so designed that, at this point in the stroke of the mechanism, there will be some clearance left between the wedge follower D and the element E as indicated at 135 in Fig. 4. When the condition is rigid as shown in Fig. 4, the wedge action on the shoes becomes that of a keen wedge thereby automatically increasing the outward pressure on the shoes and the frictional resistance of the mechanism. The clearance 135 is left for the reason that, as the keen wedge members advance or tend to advance longitudinally of the shoes C, there will be a slight relative movement between the same and the blunt wedge element E due to the slower inward movement of the latter, the parts being so proportioned that there will not be actual contact between the follower D and the element E. For the remainder of the compression stroke after the parts have reached the condition shown in Fig. 4, the action is substantially that of the keen wedges 124 acting on the shoes C.

In release, upon discontinuance of the actuating force there is an immediate expansion of the high capacity preliminary spring F which disengages the keen wedge faces 124 from the wedge faces 24 thus substantially instantaneously releasing the shoes of the keen wedge pressure and automatically substituting the blunt wedge faces 123. The collapse or release of the shoes may be easily effected under the expansion of the main spring B reacting through the shoes and by the slight contraction of the friction shell which, as will be understood by those skilled in the art, will have been expanded slightly during the compression stroke.

From the preceding description, it will be seen that I have designed a mechanism which not only provides an initially high capacity preliminary spring action, but also a mechanism wherein a change is automatically and gradually effected from a preliminary spring resistance to a blunt wedge action and then from the latter to a keen wedge action and wherein the wedging system is self-releasing.

I have herein shown and described what I now consider the preferred manner of carrying out the invention, but the same is by way of description only and not by way of limitation. All changes and modifications are contemplated that come within the scope of the claims appended hereto.

I claim:

1. In a friction shock absorbing mechanism, the combination with a friction shell and a main spring resistance; of friction shoes cooperable with said shell and having wedge faces extending at different angles with respect to the line of movement of the shoes; and a multiple part self-releasing wedge system, the elements of which have wedge faces cooperable with said different angled wedge faces of the shoes, and means for normally maintaining a spaced relation between the wedge faces on one of said elements and the co-acting wedge faces of said shoes.

2. In a friction shock absorbing mechanism, the combination with a friction shell and a main spring resistance; of friction shoes cooperable with said shell and having wedge faces extending at different angles with respect to the line of movement of the shoes; a multiple part self-releasing wedge system, the elements of which have wedge faces cooperable with said different angled wedge faces of the shoes, said multiple part wedge system including two separate wedge elements; and means for normally maintaining a spaced relation between the wedge faces of one of said elements and the co-acting wedge faces of said shoes.

3. In a friction shock absorbing mechanism, the combination with a friction shell and a main spring resistance; of friction shoes cooperable with said shell and having wedge faces extending at different angles with respect to the line of movement of the shoes; and a multiple part self-releasing wedge system, the elements of which have wedge faces cooperable with said different angled wedge faces of the shoes, said different angled wedge faces being so disposed that a plane extending transversely to the line of movement of the shoes will intersect all of said wedge faces.

4. In a friction shock absorbing mechanism, the combination with a friction shell and a main spring resistance; of friction shoes cooperable with said shell and having wedge faces extending at different angles with respect to the line of movement of the shoes; and a multiple part self-releasing wedge system, the elements of which have wedge faces cooperable with said different angled wedge faces of the shoes, said multiple part wedge system including two separate wedge elements and a spring interposed therebetween, all of said different angled wedge faces being so located that a plane extending transverse to the line of movement of said shoes will intersect all of said wedge faces.

5. In a friction shock absorbing mechanism, the combination with a friction shell and a main spring resistance; of friction shoes cooperable with said shell, each shoe having a wedge face extending at a relatively blunt angle with respect to the axis of the mechanism and a wedge face extending at a relatively acute angle with respect to the axis of the mechanism; a multiple part wedge cooperable with said shoes, said multiple part wedge including, two separate wedge elements, one of said wedge elements having wedge faces cooperable with said acute wedge faces of the shoes and the other element having wedge faces cooperable with said blunt wedge faces of the shoes; and means for normally maintaining a spaced relation between said acute angle wedge faces of one of said shoes and the wedge faces of the element co-acting therewith.

6. In a friction shock absorbing mechanism, the combination with a friction shell and a main spring resistance; of friction shoes cooperable with said shell and having wedge faces extending at different angles with respect to the axis of the mechanism; and a multiple part wedge having wedge faces cooperable with said wedge faces of the shoes, said mutiple part wedge including two separate wedge elements and a high capacity spring interposed therebetween, said high capacity spring comprising a plurality of separate coils in parallel abutting relation.

7. In a friction shock absorbing mechanism of the character described, the combination with a friction shell; of a main spring resistance; friction shoes cooperable with said shell, each of said shoes having a relatively blunt angled wedge face and a relatively keen angled wedge face; of a wedge element having relatively blunt angled wedge faces cooperable with said blunt wedge faces of the shoes; a second wedge element having relatively keen angled wedge faces adapted to cooperate with said keen angled wedge faces of the shoes but normally out of contact therewith; and spring means normally maintaining said spaced relation between said sets of keen angled wedge faces.

8. In a friction shock absorbing mechanism of the character described, the combination with a friction shell; of a main spring resistance; friction shoes cooperable with said shell, each of said shoes having a relatively blunt angled wedge face and a relatively keen angled wedge face; of a wedge element having relatively blunt angled wedge faces cooperable with said blunt wedge faces of the shoes; a second wedge element having relatively keen angled wedge faces adapted to cooperate with said keen angled wedge faces of the shoes but normally out of contact therewith; and a preliminary spring resistance interposed between said keen angled wedge element and the blunt angled wedge element.

9. In a friction shock absorbing mechanism, the combination with a casting having a friction shell at one end and a spring cage at the opposite end; of a main spring resistance disposed within said cage; of a plurality of friction shoes cooperable with said shell, each shoe having a relatively blunt angled wedge face and a relatively keen angled wedge face; of a wedge element having relatively blunt angled wedge faces cooperable with and normally in contact with said blunt angled wedge faces of the shoes; a second wedge element normally separated from said first named wedge element and having relatively keen angled wedge faces adapted to cooperate with the said keen angled wedge faces of the shoes but normally separated therefrom; and a high capacity preliminary spring interposed between said wedge element, said high capacity spring including a plurality of separate coils in parallel abutting relation.

10. In a friction shock absorbing mechanism, the combination with a column-load-sustaining member having friction surfaces extending in the general direction of length of said member; of friction shoes cooperable with the friction surfaces of said member and movable relatively longitudinally thereof; a main spring resistance operatively interposed between said member and shoes to yieldingly resist relative movement therebetween; and a pressure-transmitting wedging device, including an element having wedge faces, said wedge faces being initially ineffective to exert wedge action with respect to the shoes, but adapted to become effective after a predetermined relative movement between the shoes and said member; and means for moving the shoes relative to said member during said initial relative movement.

11. In a friction shock absorbing mechanism, the combination with a column-load-sustaining member having friction surfaces extending in the general direction of length of said member; of a friction system co-operable with the friction surfaces of said member and movable as a unit relatively longitudinally thereof, said system including a plurality of friction elements; a main spring resistance operatively interposed between said member and friction system to yieldingly resist relative movement therebetween; and a wedging device having wedge faces, said wedge faces being initially ineffective to exert wedge action with respect to said friction elements but adapted to become effective after a predetermined relative initial movement between said elements and member; and means for moving the elements relative to said member during said initial relative movement.

In witness that I claim the foregoing I have hereunto subscribed my name this 23rd day of June, 1921.

JOHN F. O'CONNOR.

Witnesses:
 CARRY GAILING,
 ANN BAKER.